US007898943B2

(12) United States Patent
Yan

(10) Patent No.: US 7,898,943 B2
(45) Date of Patent: Mar. 1, 2011

(54) METHOD FOR SWITCHING ROUTE AND NETWORK DEVICE THEREOF

(75) Inventor: Weizhong Yan, Guangdong (CN)

(73) Assignee: Huawei Technologies Co., Ltd., Shenzhen (CN)

(*) Notice: Subject to any disclaimer, the term of this patent is extended or adjusted under 35 U.S.C. 154(b) by 381 days.

(21) Appl. No.: 10/591,218

(22) PCT Filed: Jan. 9, 2006

(86) PCT No.: PCT/CN2006/000018

§ 371 (c)(1),
(2), (4) Date: Nov. 21, 2007

(87) PCT Pub. No.: WO2006/074596

PCT Pub. Date: Jul. 20, 2006

(65) Prior Publication Data

US 2008/0212465 A1 Sep. 4, 2008

(30) Foreign Application Priority Data

Jan. 14, 2005 (CN) .......................... 2005 1 0032840

(51) Int. Cl.
*G01R 31/08* (2006.01)
(52) U.S. Cl. ...................... 370/225; 370/238; 370/255
(58) Field of Classification Search ......... 370/200–253, 370/272–390, 431–546
See application file for complete search history.

(56) References Cited

U.S. PATENT DOCUMENTS 6,535,491 B2 * 3/2003 Gai et al. .................... 370/256

(Continued)

FOREIGN PATENT DOCUMENTS

CN 1555165 A 12/2004

(Continued)

OTHER PUBLICATIONS

A mini-FRR (Fast Rerouting) mechanism for IP/MPLS network; IETF Standard-Working-Draft, Internet Engineering Task Force, IETF, CH Shaoling Sun et al, Feb. 2005, XP015037757.

(Continued)

*Primary Examiner*—Ricky Ngo
*Assistant Examiner*—Iqbal Zaidi
(74) *Attorney, Agent, or Firm*—Conley Rose, P.C.; Grant Rodolph

(57) ABSTRACT

A method for switching route and a network device are disclosed, wherein the method comprises: setting a relationship between a port number of each destination port and a port number of the transmitting port, the port number of each transmitting port is the port number of the corresponding destination port; when there is a service failure in any destination port, modifying the port number of the transmitting port corresponding to a fault destination port into the port number of the backup port corresponding to the fault destination port in the set relationship, and saving the modified relationship; after receiving a data packet, the network device transmitting the data packet based on the saved relationship. The network device comprises a CPU, a first routing unit and a second routing unit. In accordance with the present invention, the time consumed by modifying routing data can be reduced, enabling the network device to switch route quickly and the user services to recover quickly.

17 Claims, 4 Drawing Sheets

U.S. PATENT DOCUMENTS

| | | | |
|---|---|---|---|
| 7,042,837 B1* | 5/2006 | Cassiday et al. | 370/225 |
| 7,058,009 B1* | 6/2006 | Skirmont et al. | 370/217 |
| 2002/0150114 A1* | 10/2002 | Sainomoto et al. | 370/402 |
| 2003/0110287 A1 | 6/2003 | Mattson | |
| 2003/0172143 A1* | 9/2003 | Wakayama | 709/223 |
| 2004/0103210 A1* | 5/2004 | Fujii et al. | 709/239 |
| 2005/0028216 A1* | 2/2005 | Vogel et al. | 725/107 |
| 2005/0099983 A1* | 5/2005 | Nakamura et al. | 370/338 |

FOREIGN PATENT DOCUMENTS

| | | |
|---|---|---|
| CN | 100459569 C | 2/2009 |
| EP | 1318648 A2 | 6/2003 |
| JP | 7-250129 | 9/1995 |
| JP | 2002-252625 A | 9/2002 |
| WO | WO 02/23780 A | 3/2002 |
| WO | WO0223780 * | 3/2002 |
| WO | WO 2004/010653 A1 | 1/2004 |

OTHER PUBLICATIONS

"Fast Reroute Techniques in RSVP-TE"; Internet Citation, Nov. 2001, XP002243650.

Tanenbaum, A., "Computer Networks," 3rd edition, Chinese translation, pp. 350 and 351.

* cited by examiner

| identifier value of data packet | destination port number |
|---|---|
| 0 | 3 |
| 1 | 0 |
| 2 | 1 |
| 3 | 3 |
| 4 | 1 |
| 5 | 3 |
| ... | ... |

Figure 1 first routing table

| data packet identifier value | port number of the destination port |
|---|---|
| 0 | 3 |
| 1 | 0 |
| 2 | 1 |
| 3 | 3 |
| 4 | 1 |
| 5 | 3 |
| ... | ... | second routing table

| port number of the destination port | port number of the transmitting port |
|---|---|
| 0 | 0 |
| 1 | 1 |
| 2 | 2 |
| 3 | 3 |
| 4 | 4 |
| 5 | 5 |
| ... | ... |

Figure 2 first routing table

| data packet identifier value | port number of the destination port |
|---|---|
| 0 | 3 |
| 1 | 0 |
| 2 | 1 |
| 3 | 3 |
| 4 | 1 |
| 5 | 3 |
| ... | ... | second routing table

| port number of the destination port | port number of the transmitting port |
|---|---|
| 0 | 0 |
| 1 | 3 |
| 2 | 2 |
| 3 | 3 |
| 4 | 4 |
| 5 | 5 |
| ... | ... |

Figure 5

METHOD FOR SWITCHING ROUTE AND NETWORK DEVICE THEREOF

FIELD OF THE TECHNOLOGY

The present invention relates to communication techniques, and particularly, to a method for switching route and a network device.

BACKGROUND OF THE INVENTION

At present, a network device, e.g. a router or a switch, after receiving a data packet from a line, replaces or modifies the head of the received data packet, and then transmit it to a destination port which is found by searching a routing table. The routing table is usually has the format as shown in FIG. 1.

Refer to FIG. 1, for example, after receiving the data packet whose identifier value is 4, the network device finds out the destination port whose port number is 1 corresponding to the identifier value 4 by searching the routing table, and then the network device transmits the data packet from the destination port whose port number is 1. In addition, in a data communication system, user services need to be protected, therefore, if there is a failure in the network device or on a communication link, user services should be switched to a backup device or a backup link in time in order to recover and the interruption time should be reduced as much as possible. Presently, a very important method of service protection is the switching route technique, which includes: when there is a service failure in one of the destination ports of a network device (herein and hereinafter a service failure in a destination port means that there is a failure on a communication link or in other network devices connected with the destination port), the network device will modify the corresponding port number of the destination port in its routing table, that is, changing the port number in the routing table corresponding to the fault destination port into the port number of the backup device or the backup link; thus, when receiving a data packet, by searching the modified routing table, the network device will transmit the data packet which was previously to be transmitted via the destination port in which there is a failure to the backup device or backup link via the backup port connecting the network device with the backup device or the backup link.

As shown in FIG. 1, in the routing table of the network device, different data packet identifiers may map to the port number of one destination port, that is, one port number of the destination port could appears several times repeatedly in the routing table. Thus, the network device needs to implement repetitious modifying operations when switching route and modifying the routing table. For instance, as shown in FIG. 1, suppose that the destination port whose port number is 0 is the backup port for the destination port whose port number is 3, when there is a service failure in the destination port whose port number is 3, all the destination port whose port number is 3 in the routing table shown in FIG. 1 should be modified into the destination port whose port number is 0; refer to FIG. 1, as there are many destination port whose port number is 3 in the routing table, the network device must search every destination port whose port number is 3, and modify the port numbers into the destination port whose port number is 0 respectively. However, the searching and modifying operations are repetitious, which leads to slow switching route. As a result, services at destination port whose port number is 3 of the network device could not be switched to the destination port whose port number is 0 in time and service interruption time becomes longer. In addition, because of repetitious searching and modifying operations for the same port number of the destination, the load of service on the CPU of the network device increases, thus the processing speed for other services is affected.

SUMMARY

A method for switching route, including the steps of:

setting a correspondence relationship between a port number of each destination port and a port number of a transmitting port of a network device, the port number of each transmitting port is the corresponding port number of the destination port;

when there is a service failure in any destination port of the network device, modifying the port number of the transmitting port corresponding to the destination port in which there is a service failure into the port number of a backup port corresponding to the destination port in which there is the service failure in the set corresponding relationship, and saving the modified relationship; modifying the port number of the transmitting port into the port number of a back up port and after receiving a data packet, the network device transmits the data packet based on the saved correspondence relationship.

A network device includes:

a CPU;

a first routing unit; and a second routing unit, the CPU is used for monitoring each destination port of a network device in real time, and when a service failure is found in any destination port of the network device, the CPU transmits the information of the service failure to the first routing unit, modifies a port number of a transmitting port corresponding to a fault destination port into the port number of the backup port corresponding to the fault destination port in the correspondence relationship between the port number of each destination port and the port number of the transmitting port which is saved in the second routing unit;

the first routing unit is used for saving the existing routing table of the network device, and it receives the information of the service failure from the CPU, finds out the port number of the destination port corresponding to the received data packet based on the self-stored routing table, and transmits the found port number of the destination port to the second routing unit;

the second routing unit is used for saving the relationship between the port number of each destination port and the port number of the transmitting port in the network device, when receiving the port number of the destination port sent from the first routing unit, searches out the port number of the transmitting port corresponding to the received port number of the destination port in the saved relationship, transmits the data packet via the destination port indicated by the port number of the transmitting port searched out.

Thus, the present invention has the following advantages:

(1) when switching route, as each destination number is unique in the correspondence relationship between the destination port number and the transmitting port number, it is not necessary for network node device to implement repetitious searching and modifying operations, but just to modify a practical transmitting port corresponding to this destination port, thereby, time consumed by modifying routing data reduces much, such that network node device switches route quickly and user service is recovered quickly. In addition, in this invention, the relationship between each destination port number and transmitting port number is saved in fixed order in advanced, thus, when switching route, network node device implements modifying in fixed position without the searching process so that time consumed by switching route further reduces.

(2) when switching route, as it is not necessary to implement repetitious searching and modifying operations but just to modify a practical destination port corresponding to this logic destination port, workload of CPU in network node device lessens greatly, and the affection of switching route on user services connecting to other ports reduces, too.

BRIEF DESCRIPTION OF THE DRAWINGS

FIG. 1 is a schematic diagram illustrating the original routing table of a network device.

FIG. 2 is a schematic diagram illustrating a first routing table and an initial second routing table in accordance with an embodiment of the present invention.

FIG. 5 is a schematic diagram illustrating a first routing table and a modified second routing table in accordance with an embodiment of the present invention.

DETAILED DESCRIPTION OF THE EMBODIMENTS

A method for switching route is provided by the present invention, which includes: setting a relationship between a port number of each destination port and a port number of the transmitting port in the network device, the port number of each transmitting port is the corresponding port number of the destination port; when there is a service failure in any destination port of the network device, the network device changes and saves the port number of the transmitting port corresponding to the destination port where there is a service failure into the port number of the backup port which is corresponding to the destination port where there is a service failure in the relationship; and the network device transmits the data packet based on the saved relationship after receiving the data packet.

According to an embodiment of the present invention, when implementing a practical service, the set relationship can be saved as a routing table. As there has already been a routing table for saving the relationship between the data packet identifiers and the port numbers of the destination port in the network device in the prior art, for the differentiating purpose, the routing table of the network device in the prior art shown in FIG. 1 is called as a first routing table while the newly set routing table where the relationship saved is called as a second routing table. FIG. 2 is a schematic diagram illustrating the first routing table and the initial second routing table in accordance with an embodiment of the present invention. As shown in FIG. 2, in the first routing table, one port number of the destination port of the network device appears several times, this leads to too many table entries, while, in the second routing table newly set in accordance with the embodiment of the present invention, the port number of each destination port only appears once so that number of the table entries decreases greatly. Therefore, when there is a service failure in one destination port, it is only needed to modify the port number in the second routing table in accordance with the embodiment of the present invention, the data packet to be transmitted subsequently could be transmitted based on the modified second routing table so as to greatly reduce the workload of modifying the routing table while ensuring that the data packet is transmitted correctly.

In addition, when every destination port of the network device runs well, the process of transmitting the data packet in accordance with the embodiment of the present invention may include the method for transmitting the data packet in the prior art, i.e. transmitting the data packet based on the first routing table; or include the method for transmitting the data packet based on both the first routing table and the second routing table.

Figure 3:
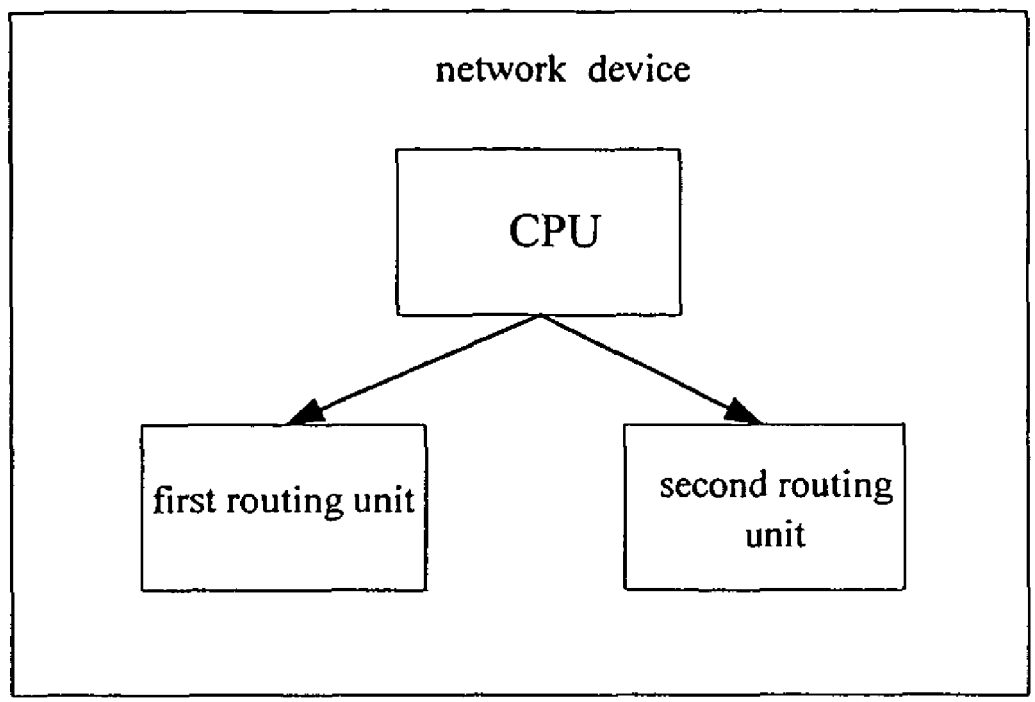
FIG. 3 is a schematic diagram illustrating the structure of the network device in accordance with an embodiment of the present invention.

The present invention also provides a network device. FIG. 3 is a schematic diagram illustrating the structure of the network device in accordance with the embodiment of the present invention. As shown in FIG. 3, the network device provided by the present invention includes a CPU, a first routing unit and a second routing unit.

Wherein, each destination port of the network device is monitored by the CPU in real time, when the service failure is found in any destination port of the network device, the CPU transmits the information of service failure to the first routing unit, and modifies the port number of the transmitting port corresponding to a fault destination port into the port number of the backup port corresponding to the destination port where there is a service failure in the relationship between the port number of each destination port and the port number of the transmitting port, and the relationship is saved in the second routing unit;

The first routing unit is used to save the routing table in the prior art in the network device upon receiving the information of service failure from the CPU, the first routing unit, finds out the port number of the destination port corresponding to the received data packet based on the routing table saved in itself, and transmits the found port number of the destination port to the second routing unit;

The relationship between the port number of each destination port and the port number of the transmitting port in the network device is saved by the second routing unit, when receiving the port number of the destination port sent from the first routing unit, the second routing unit searches out the port number of the transmitting port corresponding to the received port number of the destination port in the saved relationship between port number of each destination port and the port number of the transmitting port, then transmits the data packet via the destination port corresponding to the searched out port number of the transmitting port.

In addition, the data packets can be transmitted by the first routing unit based on the first routing table saved therein when every destination port of the network device runs well.

Or, the first routing table, when every destination port of the network device runs well, finds out the port number of the destination port which is corresponding to the data packet according to the first routing table saved therein, and then transmits it to the second routing unit; and the second routing unit, when every destination port of the network device runs well, searches out the port number of the transmitting port corresponding to the received port number of the destination port in the second routing table, and transmits the data packet via the destination port corresponding to the searched out port number of the transmitting port.

Figure 4:
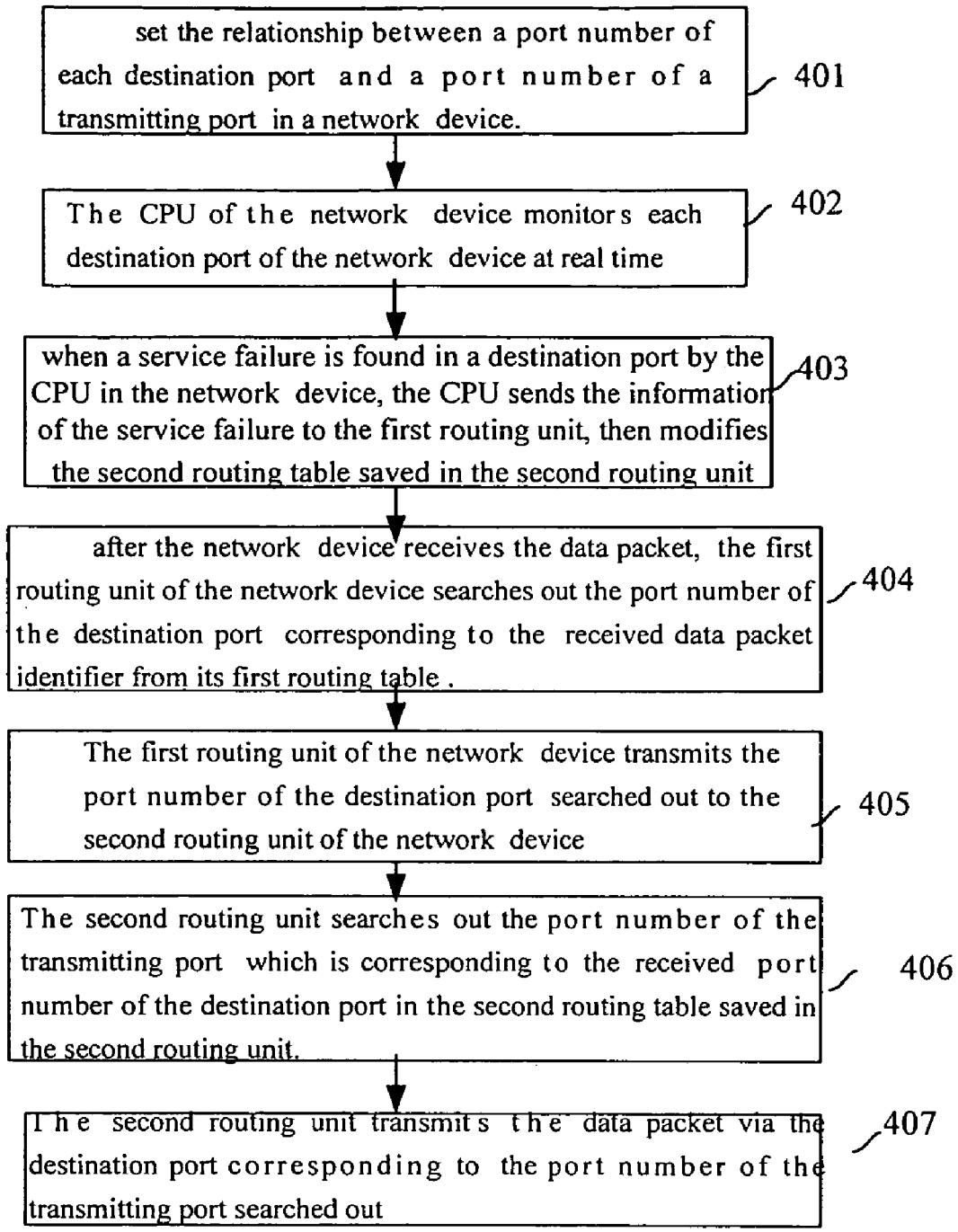
FIG. 4 is a flowchart of an embodiment of the present invention.

FIG. 4 is the flowchart of an embodiment of the present invention. As shown in FIG. 2, FIG. 3 and FIG. 4, using the network device provided by the embodiment of the present invention, the process of switching route according to the method provided by the present invention includes the steps of:

Step 401: setting the relationship between the port number of each destination port and the port number of the transmitting port, in the second routing unit of the network device.

The port number of each transmitting port is initially set as its corresponding port number of the destination port. As shown in FIG. 2, in the embodiment of the present invention, the set relationship could be saved as the second routing table shown in FIG. 2.

Step 402: the CPU of the network device monitors each destination port of the network device in real time.

The process of the CPU implements real-time monitoring includes: the CPU of the network device transmits a message periodically via each destination port of the network device to the devices connected with the destination port, and determines whether the CPU receives a response message returned from the devices connected with the destination port via the destination port in a set period, if the CPU receives a response message returned from the devices connected with the destination port via the destination port in a set period, it determines there is no service failure in the destination port, which means the destination port can run well, and it is not necessary to implement switching route; if the CPU has not received a response message returned from the devices connected with the destination port via the destination port in a set period, it determines there is a service failure in the destination port, thus it is necessary to carry out switching route.

In this step, if the CPU finds that every destination port runs well, the method adopted by the network device for transmitting the data packet includes:

1. transmitting the data packet based on the first routing table of the network device.

Referring to FIG. 1, for instance, when the first routing unit of the network device receives a data packet whose identifier value is 4, the first routing unit searches the self-stored first routing table shown in FIG. 1 to find out the destination port whose port number is 1 corresponding to the identifier 4, then transmits the data packet via the destination port whose port number is 1.

2. transmitting the data packet with both the first routing table and second routing table.

As in the second routing table initially set in accordance with the embodiment of the present invention, the port number of the transmitting port corresponding to the port number of each destination port is the port number of the destination port, i.e. 0 to 0, 1 to 1, etc., the method of transmitting the data packet with both the first routing table and the second routing table is identical with the method of transmitting the data packet with the first routing table in the prior art. As shown in FIG. 1, for example, if the network device receives a data packet whose identifier value is 4, then the first routing unit searches the first routing table to find out that the port number of the destination port which is corresponding to identifier 4 is 1, and then transmits the found port number 1 of the destination number to the second routing unit of the network device; upon finding out the port number of the transmitting port which is corresponding to the received port number 1 of the destination port is 1 by searching the second routing table of the second routing unit, the second routing unit transmits the data packet via the destination port whose port number is 1.

Step 403: when the service failure is found in the destination port by the CPU of the network device, the CPU transmits the information of service failure to the first routing unit, and modifies the second routing table saved in the second routing unit.

The modifying process includes: in the second routing table, the CPU changes the port number of the transmitting port corresponding to the fault destination port into the port number of the backup port corresponding to the destination port where there is a service failure.

In addition, the CPU transmits information of service failure to the first routing unit to instruct the first routing unit to carry out the subsequent process of switching route.

FIG. 5 is a schematic diagram illustrating the first routing table and the modified second routing table in an embodiment of the present invention. As shown in FIG. 5, for example, if there is a service failure in the destination port, whose port number is 1, of the network device and the backup port corresponding to the destination port whose port number is 1 is the destination port whose port number is 3. In this step, the CPU modifies the original port number 1 corresponding to the destination port whose port number is 1 into the destination port whose port number is 3. As shown in FIG. 5, since the port number of the destination port is unique in the second routing table, it is not necessary for the CPU to implement repetitious modifying process as in the prior art, instead, only one modifying operation is needed, thus the speed of switching route increases enormously.

In addition, while setting the second routing table in step 401, the position of the port number of each destination port could be fixed in the second routing table. For instance, setting the destination port whose port number is 1 as the first entry, whose port number is 2 as the second entry, and whose port number is 3 as the third item, etc. Thus in step 403, the CPU acquires destination port whose port number is 1 where there is a service failure from the first entry of the second routing table without searching the routing table. As a result, the searching time is much less and the speed of switching route is much higher than in the prior art.

Step 404: after the network device receives the data packet, the first routing unit of the network device, searches out the port number of the destination port corresponding to the received data packet identifier from its first routing table based on the information of service failure received.

Step 405: the first routing unit of the network device transmits the port number of the destination port searched out to the second routing unit of the network device.

The implementing process includes: the first routing unit of the network device has the searched-out port number of the destination port carried in the data packet, e.g. stamps the label of the found port number of the destination port on the data packet before transmits the data packet to the second routing unit of the network device.

Step 406: the second routing unit searches out the port number of the transmitting port which is corresponding to the received port number of the destination port from the second routing table saved by it.

Herein, if the port number of the destination port searched out by the first routing unit is carried in the data packet, the second routing unit first finds out the port number of the destination port from the data packet received, and then carries out the searching process.

In step 401, when setting the second routing table, the position of the relationship between the port number of each destination port and the port number of the transmitting port could be fixed, thus in Step 406, the port number of the transmitting port could be found directly at the corresponding position in the second routing table based on the received port number of the destination port. For example, according to the sequence of the port number of each destination port, the order of the relationship between the port number of each destination port and the port number of the transmitting port in the second routing table could be set, that is, the relationship between the destination port whose port number is 1 and the port number of the transmitting port is the first entry in the second routing table, and the relationship between the destination port whose port number is 2 and the port number of the transmitting port is the second entry in the second routing table; in this way, in Step 406, for instance, if the port number of the destination port received by the second routing unit is 2, the second routing unit could implement the searching in the second entry of the second routing table so as to speed up the switching route.

Step 407, the second routing unit transmits the data packet via the destination port indicated by the port number of the transmitting port searched out.

An example for the process from step 404 to step 407 mentioned above is: the first routing unit determines by analysis that the identifier value of the data packet received by the network device is 2, then the first routing unit finds out the port number of the destination port which is corresponding to the data packet whose identifier value is 2 is 1 by searching the first routing table and transmits the port number 1 of the destination port to the second routing unit by carrying it in the data packet; the second routing unit finds out the port number of the destination port is 1 from the received data packet, and finds out the port number of the transmitting port which is corresponding to the port number of the destination port is 3 by searching the second routing table saved by itself, and then transmits the data packet via the destination port indicated by the port number 3 of the transmitting port. As can be seen, since the port number of the transmitting port which is corresponding to the fault destination port whose port number is 1 is changed in advance in accordance with the embodiment of the present invention from the initial port number 1 into port number 3 of the backup port, a switching route process can be implemented.

The foregoing process shown in FIG. 4 is applicable to the switching route process of the network device when transmitting the data packets in the uplink and the downlink directions. That is, the first routing tables and second routing tables are set for the uplink direction and the downlink direction, respectively; when the foregoing process shown in FIG. 4 is adopted in the uplink direction, the first routing table and the second routing table are both corresponding to the uplink direction, and the destination ports are those used for transmitting the data packets in the uplink direction; when adopted in the downlink direction, the first routing table and the second routing table are both corresponding to the downlink direction, and the destination port(logical port)s are used for transmitting the data packet in the downlink direction.

The foregoing description is only preferred embodiments of the present invention, and is not used for limiting the protection scope thereof. Any modification, equivalent replacement and improvement based on the principle and spirit of the present invention should be covered by the protection scope of the present invention.

The invention claimed is:

1. A method comprising:
receiving a data packet comprising a data packet identifier;
identifying a destination port corresponding to the data packet identifier from a first routing table, wherein there is a first association between the data packet identifier and the destination port in the first routing table; and
transmitting the data packet via a transmitting port corresponding to the destination port based on a second association between the destination port and the transmitting port in a second routing table, wherein the transmitting port is used to transmit other data packets regardless of whether a failure is associated with the destination port, wherein each destination port appears only once in the second routing table, and
wherein the order of the second association is set according to the sequence of the port numbers of the destination port, and wherein at least one of the transmitting ports in the second routing table is associated with a plurality of the destination ports when the failure is associated with one of the plurality of the destination ports.

2. A method comprising:
receiving a data packet comprising a data packet identifier;
identifying a destination port corresponding to the data packet identifier from a first routing table, wherein there is a first association between the data packet identifier and the destination port in the first routing table; and
transmitting the data packet via a transmitting port corresponding to the destination port based on a second association between the destination port and the transmitting port in a second routing table, wherein the transmitting port is used to transmit other data packets regardless of whether a failure is associated with the destination port,
wherein transmitting the data packet via a transmitting port corresponding to the destination port based on a second association between the destination port and the transmitting port in a second routing table comprises:
searching out the transmitting port corresponding to the destination port according to the second association; and
transmitting the data packet via the transmitting port,
wherein each destination port appears only once in the second routing table.

3. A network device, comprising:
a processor;
a first routing unit; and
a second routing unit,
wherein the processor is configured to communicate with the first routing unit and the second routing unit,
wherein the first routing unit is configured to save a first association between a data packet identifier and a destination port in a first routing table, and identify the destination port corresponding to the data packet identifier from the first routing table after receiving a data packet,
wherein the second routing unit is configured to save a second association between the destination port and a transmitting port in a second routing table, and transmit the data packet via the transmitting port corresponding to the destination port based on the second association, and
wherein each destination port appears only once in the second routing table,
wherein the order of the second association is set according to the sequence of the port numbers of the destination port, and
wherein at least one of the transmitting ports in the second routing table is associated with a plurality of the destination ports when the failure is associated with one of the plurality of the destination ports.

4. The network device according to claim 3, wherein the second routing unit is further configured to search out the transmitting port corresponding to the destination port according to the second association.

5. The method according to claim 1, wherein the port number of the transmitting port is set to a port number of the destination port in the second table when the transmitting port is operating normally.

6. The method according to claim 5, wherein when there is a service failure in any destination port, the transmitting port corresponding to the fault destination port is modified into a backup port of the fault destination port.

7. The method according to claim 6, wherein each destination port appears only once in the second routing table.

8. The method according to claim 1, wherein the first routing table is not modified when there is a service failure in any destination port.

9. The method according to claim 8, wherein the data packet is not transmitted on the first transmitting port when a failure occurs in the first transmitting port.

10. The network device according to claim 3, wherein the port number of the transmitting port is set to a port number of the destination port in the second routing table when the transmitting port is operating normally.

11. The network device according to claim 3, wherein when there is a service failure in any destination port, the transmitting port corresponding to the fault destination port is modified into a backup port of the fault destination port.

12. The method according to claim 3, wherein each destination port appears only once in the second table.

13. The network device according to claim 3, wherein the processor is configured to monitor each destination port in real time and modify the transmitting port corresponding to the fault destination port into a backup port of the fault destination port when a service failure is found in the destination port.

14. The network device according to claim 3, wherein the transmitting port is used to transmit other data packets regardless of whether a failure is associated with the destination port.

15. The network device according to claim 3, wherein the first routing table is not modified when there is a service failure in any destination port.

16. The network device according to claim 3, wherein the data packet is not transmitted on the first transmitting port when a failure occurs in the first transmitting port.

17. A device comprising:
- a first routing unit configured to save a first association between a data packet identifier and a destination port in a first routing table; and
- a second routing unit configured to save a second association; between the destination port and a transmitting port in a second routing table,
- wherein the second routing unit is further configured to search out the transmitting port corresponding to the destination port according to the second association,
- wherein the transmitting port is used to transmit other data packets regardless of whether a failure is associated with the destination port,
- wherein each destination port appears only once in the second routing table, and
- wherein at least one of the transmitting ports in the second routing table is associated with a plurality of the destination ports when the failure is associated with one of the plurality of the destination ports.

* * * * *